US009927276B2

(12) United States Patent
Della-Monica (10) Patent No.: US 9,927,276 B2
(45) Date of Patent: Mar. 27, 2018

(54) METHOD AND DEVICE FOR MONITORING THE FLOW OF A LIQUID (71) Applicant: SMART AND BLUE, Moirans (FR)

(72) Inventor: Gabriel Della-Monica, Moirans (FR)

(73) Assignee: Smart and Blue, Moirans (FR)

(*) Notice: Subject to any disclaimer, the term of this patent is extended or adjusted under 35 U.S.C. 154(b) by 0 days.

(21) Appl. No.: 15/301,175

(22) PCT Filed: Mar. 27, 2015

(86) PCT No.: PCT/EP2015/056680
§ 371 (c)(1),
(2) Date: Sep. 30, 2016

(87) PCT Pub. No.: WO2015/150247
PCT Pub. Date: Oct. 8, 2015

(65) Prior Publication Data
US 2017/0059384 A1 Mar. 2, 2017

(30) Foreign Application Priority Data

Mar. 31, 2014 (FR) ...................... 14 52781

(51) Int. Cl.
G08B 19/00 (2006.01)
G01F 15/06 (2006.01)
(Continued)

(52) U.S. Cl.
CPC .............. G01F 15/068 (2013.01); B05B 1/18 (2013.01); E03C 1/0408 (2013.01); G01F 1/06 (2013.01); G01F 15/0755 (2013.01)

(58) Field of Classification Search
CPC ............... G01F 1/06; G01F 3/00; G01F 22/00
(Continued)

(56) References Cited

U.S. PATENT DOCUMENTS 4,936,508 A 6/1990 Ingalz
2003/0233885 A1 12/2003 Bird et al.
(Continued)

FOREIGN PATENT DOCUMENTS

EP 1 610 100 A1 12/2005
EP 2 158 972 A1 3/2010
(Continued)

OTHER PUBLICATIONS

International Search Report dated Jul. 28, 2015, issued in corresponding International Application No. PCT/EP2015/056680, filed Mar. 27, 2015, 6 pages.

*Primary Examiner* — Kevin Kim
(74) *Attorney, Agent, or Firm* — Christensen O'Connor Johnson Kindness PLLC (57) ABSTRACT Method and device for monitoring the flow of a liquid, in which method and device an electronic device (25) carried by an apparatus equipped with a turbine (17) that can be rotated by a stream of fluid comprises a means of detecting at least one determined angular position of said turbine that delivers an electric pulse each time the turbine passes through this angular position. A pulse counter may count the pulses delivered. An electric current generator connected to the turbine may power the electronic device. An electrical energy accumulator may be charged by the current generator and power the electronic device.

19 Claims, 5 Drawing Sheets (51) Int. Cl.
*B05B 1/18* (2006.01)
*G01F 1/06* (2006.01)
*E03C 1/04* (2006.01)
*G01F 15/075* (2006.01)

(58) Field of Classification Search
USPC .................................................. 340/606, 609
See application file for complete search history.

(56) References Cited

U.S. PATENT DOCUMENTS

| | | | | |
|---|---|---|---|---|
| 2006/0245467 A1* | 11/2006 | Casella | .................. | G01D 4/002 374/41 |
| 2009/0106891 A1* | 4/2009 | Klicpera | ............... | B05B 12/004 4/605 |
| 2013/0197831 A1* | 8/2013 | Yonezawa | ................. | G01F 1/56 702/47 |
| 2013/0333764 A1* | 12/2013 | Wright | ..................... | E03C 1/02 137/1 |

FOREIGN PATENT DOCUMENTS

FR          2 960 638 A1    12/2011
WO      2010/075848 A1    7/2010

* cited by examiner

METHOD AND DEVICE FOR MONITORING THE FLOW OF A LIQUID

The present invention relates to the field of equipment for tracking or monitoring the flow of a fluid, such as water, through pipes of domestic or industrial installations.

European patent application EP 2 158 972 describes a shower head equipped with a turbine that is able to rotate under the effect of the water current and a generator that is driven to rotate by this turbine in order to produce an electric current for supplying electrical power to an electronic circuit and to light-emitting diodes. The electronic circuit comprises a water temperature sensor and a regulator for regulating the supply current to the light-emitting diodes so that the visual effect of the latter varies with the temperature of the water.

French patent application FR 2 960 638 describes a system for monitoring the flow rate of a fluid, comprising an electronic circuit that is capable of measuring, via a turbine driven by the fluid, the flow rate of the fluid and of warning if the flow rate of the fluid is excessive, i.e. above a predetermined value, in order to ensure a valve is closed. This system comprises a power supply battery allowing the electronic circuit to be operated autonomously. The turbine is connected to a current generator exclusively in order to charge the battery.

United States patent application US 2003/0233885 describes a device for monitoring and measuring a fluid, comprising an electronic circuit that is capable of calculating the consumed volume of fluid on the basis of a signal output by a rotation sensor detecting the rotation of a turbine driven by the fluid. The flow rate of the fluid and the consumed volume are displayed. Additionally, a maximum volume is recorded and once this determined volume has been consumed, a signal is displayed and a valve closed.

The subject of the present invention is entirely different.

A method is proposed for monitoring the flow of a liquid and operation of an electronic device borne by a unit equipped with a turbine that is capable of being driven to rotate by a stream of a fluid and a means for detecting at least one determined angular position of said turbine and delivering an electric pulse each time the turbine passes through this angular position.

The method comprises: incrementing an electric pulse counter each time the detection means delivers an electric pulse; setting, on the basis of an original value, value thresholds for the number of pulses; and selectively activating a warning means for delivering various warning signals when the numbers of pulses delivered by the pulse counter are located within value ranges determined by said value thresholds.

The method may comprise: resetting the pulse counter to said original value at the end of a predetermined period if the value of the number of pulses delivered by the pulse counter remained the same throughout this period.

The method may comprise: calculating, in real time, the frequency of said pulses; and supplying the warning means with electrical power depending on this calculated frequency.

Said warning means may be supplied with electrical power depending on the speed of rotation of said turbine.

The electric current generator may be connected to an electrical energy accumulator via a shared power supply point for the purpose of supplying electrical power and the electronic device may comprise at least a first group of circuits and a second group of circuits. The method may then comprise: detecting, in real time, the value of the speed of rotation of the turbine; supplying, via said shared point, the first group of circuits and the second group of circuits with electrical power if the value of the speed of rotation is higher than or equal to a speed threshold; and supplying, via said shared point, only said first group of circuits with electrical power if the value of the speed of rotation is lower than said speed threshold.

A method is also proposed for monitoring the flow of a liquid and operation of an electronic device which is borne by a unit equipped with a turbine that is capable of being driven to rotate by a stream of a fluid, with an electric current generator driven to rotate by said turbine and with an electrical energy accumulator for the purpose of supplying the electronic device with electrical power and which comprises at least a first group of circuits and a second group of circuits.

The method comprises: delivering electric pulses as the turbine rotates; detecting, in real time, the speed of rotation of the turbine depending on the delivered pulses; calculating the flow rate and/or the flowed volume of the fluid depending on the detected speed; activating a warning means depending on the calculated value of the flow rate and/or the flowed volume; supplying, via said shared point, the first group of circuits and the second group of circuits, which comprises the warning means, with electrical power if the value of the speed of rotation is higher than or equal to a rotational speed threshold; and supplying, via said shared point, only said first group of circuits with electrical power if the value of the speed of rotation is lower than said rotational speed threshold.

The current generator may deliver an alternating current, the electric pulses being delivered each time the value of this current crosses a threshold.

A unit for monitoring the flow of a liquid is also proposed, comprising a hollow body having an input and an output for the fluid.

This unit is equipped with a turbine placed in said body and capable of being driven to rotate by the stream of the fluid; a current generator rotatably connected to said turbine; and an electronic device supplied with electrical power by said current generator.

The electronic device comprises a means for detecting at least one determined angular position of said turbine, in order to deliver an electric pulse each time the turbine passes through this angular position; a pulse counter for counting the successive pulses delivered by said detection means; a means for setting value thresholds for the number of pulses; a comparison means for comparing the number of pulses delivered by the pulse counter to said thresholds and selectively delivering various control signals when the numbers of pulses delivered by the pulse counter are located within value ranges determined by said value thresholds; and a warning means selectively delivering various warning signals corresponding, respectively, to said various control signals.

The electronic device may comprise a means for resetting the pulse counter to an original value at the end of a predetermined period if the value of the number of pulses remained the same throughout this period.

The electronic device may comprise a means for detecting the speed of rotation of the turbine and a means for supplying the warning means with electrical power depending on this speed of rotation.

The unit may comprise an electrical energy accumulator connected to the current generator and capable of at least partially supplying the electronic device with power.

The current generator may be connected to an electrical energy accumulator via a shared power supply point and the electronic device may comprise a first group of circuits and a second group of circuits, the first group of circuits being directly connected to said shared power supply point, the second group being connected to said shared power supply point via a switch that is controlled by a detector for detecting the speed of rotation of the turbine so as to supply the second group of circuits with power only if the speed of rotation of the turbine is higher than a rotational speed threshold.

The unit may comprise a means for displaying values output by the pulse counter.

The unit may comprise a watertight box that is installed inside said hollow body, which bears said turbine and in which the electronic device and the stator of the current generator are placed, the rotor of the current generator being borne by said turbine.

A unit for monitoring the flow of a liquid is also proposed, comprising a hollow body having an input and an output for the fluid, and equipped with: a turbine placed in said body and capable of being driven to rotate by the stream of the fluid; an electric current generator connected to the current generator via a shared power supply point; and an electronic device.

The electronic device may comprise a first group of circuits and a second group of circuits, the first group of circuits being directly connected to said shared power supply point, the second group being connected to said shared power supply point via a switch that is controlled by a detector for detecting the speed of rotation of said turbine so as to supply the second group of circuits with power only if the speed of rotation of said turbine is higher than a rotational speed threshold.

The electronic device may comprise a means for detecting at least one determined angular position of said turbine, in order to deliver an electric pulse each time the turbine passes through this angular position; a pulse counter for counting the successive pulses delivered by said detection means; and a calculation means connected to said detection means, for calculating, in real time, the frequency of said pulses, corresponding to the speed of rotation of the turbine.

The electronic device may comprise a means for setting value thresholds for the number of pulses; a comparison means for comparing the number of pulses delivered by the pulse counter to said thresholds and selectively delivering various control signals when the numbers of pulses delivered by the pulse counter are located within value ranges determined by said value thresholds; and a warning means selectively delivering various warning signals corresponding, respectively, to said various control signals.

The electronic device may comprise a means for displaying values output by the pulse counter.

The current generator may deliver an alternating current, the unit comprising a means for delivering electric pulses each time the value of this current crosses a threshold.

Said hollow body may comprise a shower head.

Units for monitoring the flow of a liquid according to the present invention and their operating modes will now be described by way of non-limiting examples and illustrated by the drawings, in which.

Figure 1:
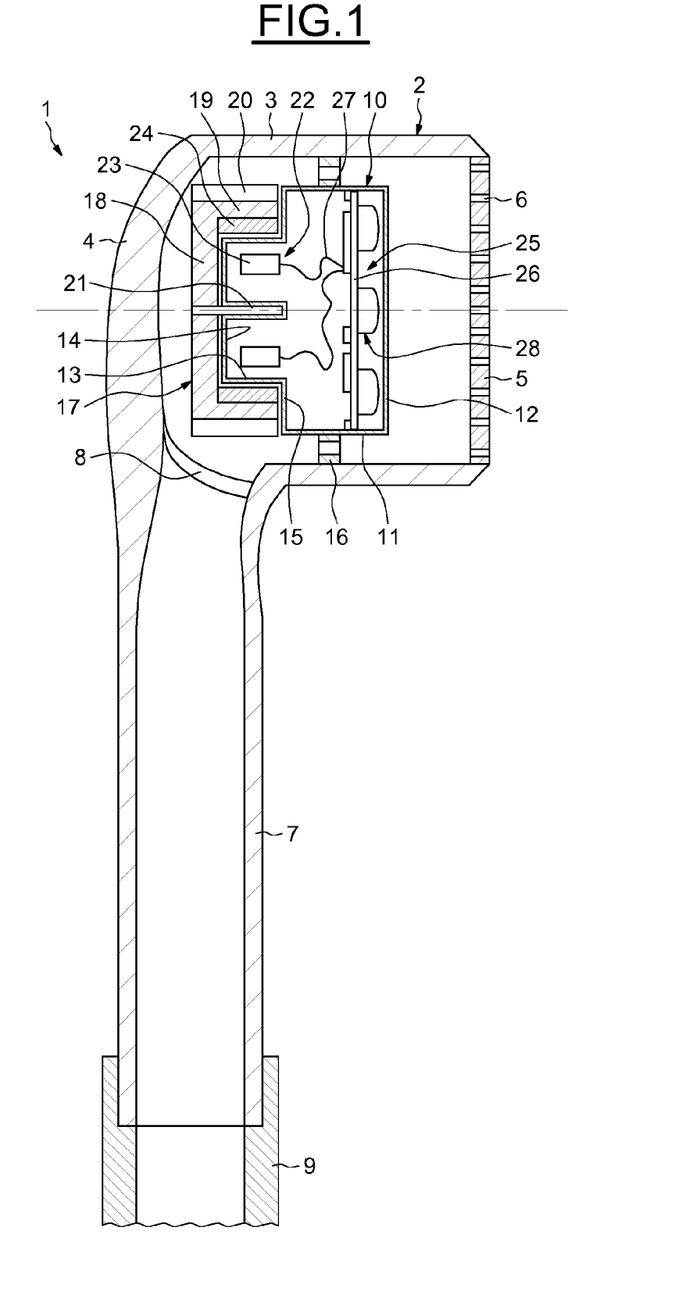
FIG. 1 shows a longitudinal cross section of a unit forming a shower head, along the axis of the output of the fluid.
Figure 2:
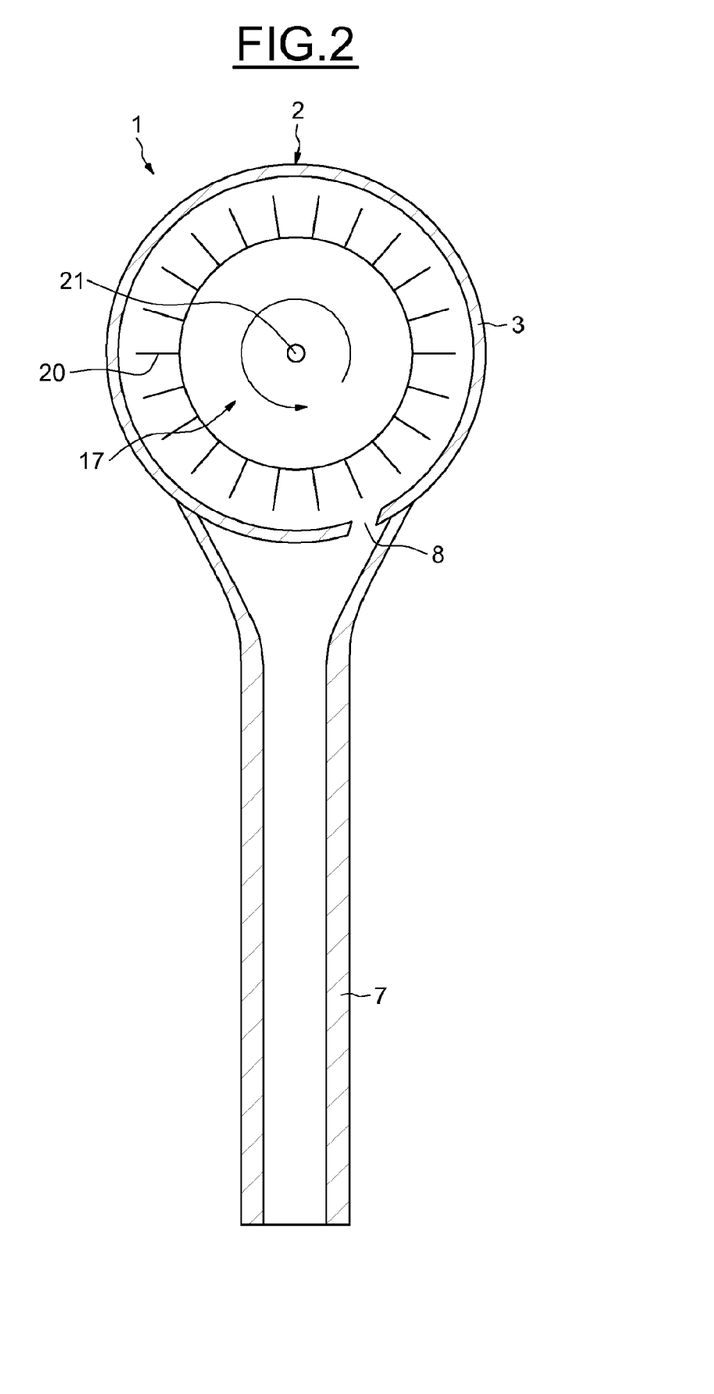
FIG. 2 shows a longitudinal cross section of the unit in FIG. 1, perpendicular to said output axis of the fluid.

According to one variant embodiment illustrated in FIGS. 1 and 2, a unit comprises a shower head 1 that comprises, for example, a hollow body 2 comprising a cylindrical peripheral wall 3, a rear radial wall 4 and an added front or frontal wall 5 which has a plurality of through-holes 6 for the output of water. This hollow body 2 is laterally equipped with a hollow elongated arm 7, generally forming a handle, that is connected to the wall 3 on the rear wall 4 side and which communicates with the interior of the hollow body 2 via a passage 8. The free end of the hollow handle 7 is connected to a generally flexible pipe 9 for transporting water under pressure.

Inside the hollow body 2, the head 1 is equipped with a watertight hollow box 10 that comprises a front portion comprising a cylindrical peripheral wall 11 located away from the peripheral wall 3 and a front radial wall 12 located away from the frontal wall 5 and that comprises a rear portion comprising a cylindrical peripheral wall 13 of smaller diameter than the cylindrical wall 11 and a rear wall 14 located away from the rear wall 4, the cylindrical walls 11 and 13 being connected by a radial annular wall 15.

The hollow box 10 is mounted suspended by spaced-apart radial arms 16 that connect the peripheral wall 3 of the body 2 and the peripheral wall 11 of the box 10.

The head 1 is equipped with a turbine 17 that comprises a radial plate 18 positioned in the space made between the rear wall 4 of the body 2 and the rear wall 14 of the box 10 and a cylindrical peripheral wall 19 that remotely surrounds the cylindrical wall 13 of the box 10 and which bears peripheral fins 20. The turbine 17 is rotatably mounted via an axial shaft 21 connecting the rear wall 14 of the box 10 and its radial plate 18.

The turbine 17 is arranged such that a stream of water under pressure, arriving via the channel of the hollow elongated handle arm 7 and entering the hollow body 2 through the passage 8, flows through the hollow body 10 by passing between the latter and the box 10 and exits in the forward direction through the holes 6 of the frontal wall 5 in the form of jets. In so doing, the stream of water acts upon the fins 20 of the turbine 17 and drives the latter to rotate. In general, the speed of rotation of the turbine 17 is substantially proportional to the flow rate of the stream of water.

The head 1 is equipped with a current generator 22, delivering an alternating current, the stator 23 of which is mounted inside the rear portion of the hollow box 2 and the rotor 24 of which is borne by the inner face of the cylindrical wall 19 of the turbine 14 and is placed away from the cylindrical wall 13 of the box 10.

The head 1 is equipped with an electronic device 25 borne by a printed circuit board 26 radially mounted inside the front portion of the hollow box 10.

The electrical device 25 is connected to the stator 23 by electrical wires 27 for the purpose of supplying it with electrical power and comprises warning and lighting means 28, such as light-emitting diodes, that are mounted on the printed circuit board 26 and in front of the latter.

At least the frontal wall 5 of the hollow body 2 and the front radial wall 12 of the hollow box 10 are, at least partly, transparent or translucent such that the light emitted by the lighting means 28 shines forth from the head 1.

Figure 3:
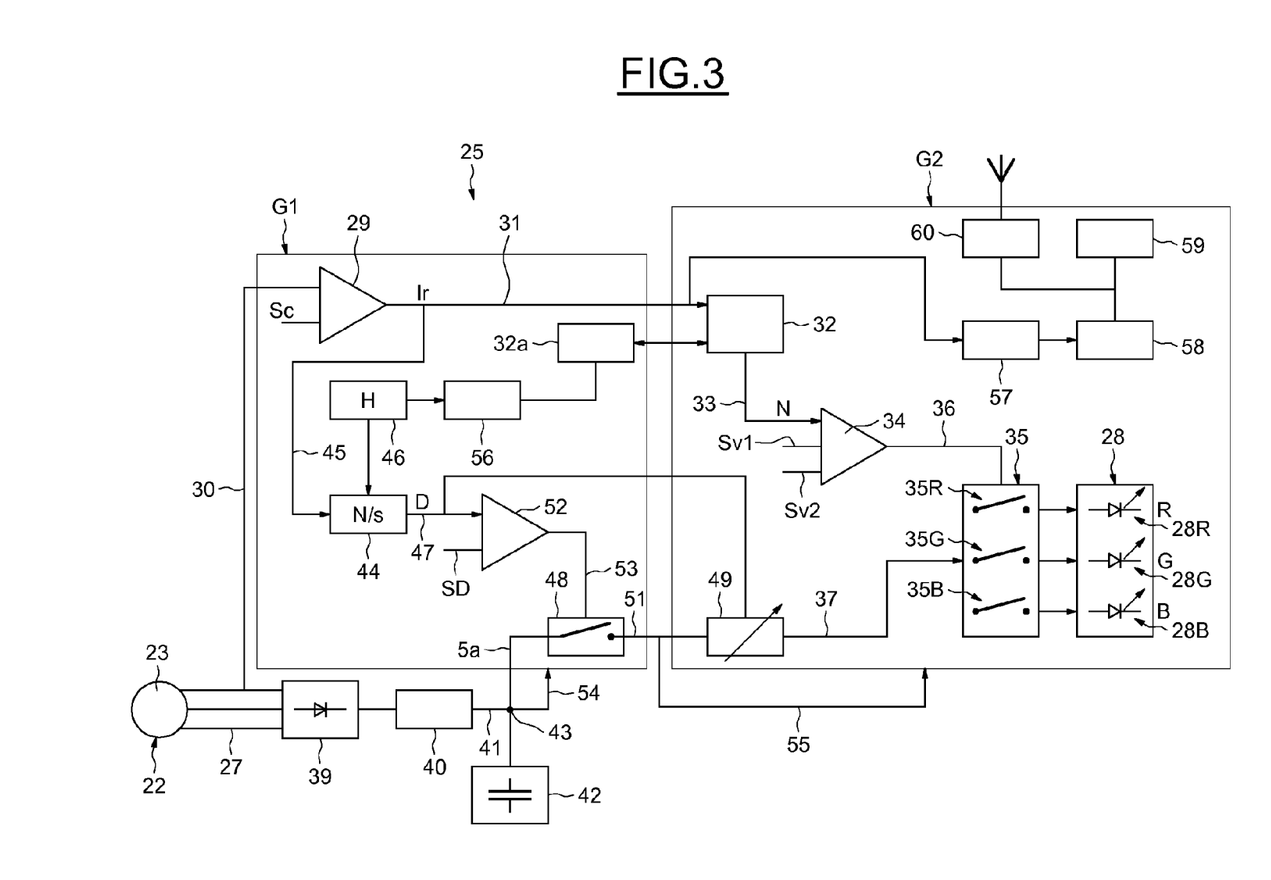
FIG. 3 shows an electronic diagram of an electronic device borne by the unit in FIG. 1.

Referring to FIG. 3 and beyond, an electrical device 25 and its operation will now be described.

The electronic device 25 comprises means for indicating the consumption of water, which are described below.

As illustrated in FIG. 3, the electronic device 25 comprises a comparator 29, one input of which is connected to the stator 23 of the current generator 22 by a line 30 and the other input is subject to a current threshold Sc. This comparator 29 delivers an electric pulse Ir over a line 31 each time the value of the substantially sinusoidal alternating current output by the stator 23 passes above the threshold Sc, i.e. each time the turbine 17 passes through one determined angular position. Thus, between two successive pulses Ir, an elementary volume Ve of water has passed through the head 1.

The electronic device 25 comprises a real-time pulse counter 32, one input of which is connected to the line 31 in order to count the pulses delivered by the comparator 29 starting from an original value and which delivers the successive numbers of counted pulses over a line 33. Each delivered number N of pulses corresponds to a volume of water V that has passed through the head 1, this volume being equal to the elementary volume Ve multiplied by this delivered number N. A memory 32a for storing the number N is associated with the pulse counter 32.

The electronic device 25 comprises a comparator 34, one input of which is connected to the line 33 and which is subject to, for example, two value thresholds Sv1 and Sv2 for the number of pulses and the output of which is connected to a power supply selector 35 by a line 36. The thresholds Sv1 and Sv2 correspond to volumes V1 and V2 of water that have flowed through the head 1, the volume V2 being greater than the volume V1.

The aforementioned lighting means 28 comprise, for example, light-emitting diodes 28G, 28B and 28R delivering, for example, green-, blue- and red-colored light warning signals, respectively.

The light-emitting diodes 28G, 28B and 28R are connected to an electrical power supply line 37, itself connected to the current generator 22 via the power supply selector 35 that comprises switches 35G, 35B et 35R which are controlled by the signals delivered by the comparator 34.

The electronic device 25 operates in the following manner.

It is initially assumed that no water is flowing through the head 1 and that the pulse counter 32 is at an original value which is equal to zero (namely: N=0). The switches 35G, 35B and 35R are in the open state.

Now, a user causes a stream of water to flow through the head 1. This stream of water causes the turbine 17 to rotate.

As the turbine 17 rotates under the effect of the stream of water, the comparator 29 detects the rotation of the turbine 17 and delivers successive pulses Ir. The counter 32 counts these pulses and increments itself and, as it counts them, delivers the number N thereof to the comparator 34.

Figure 4:
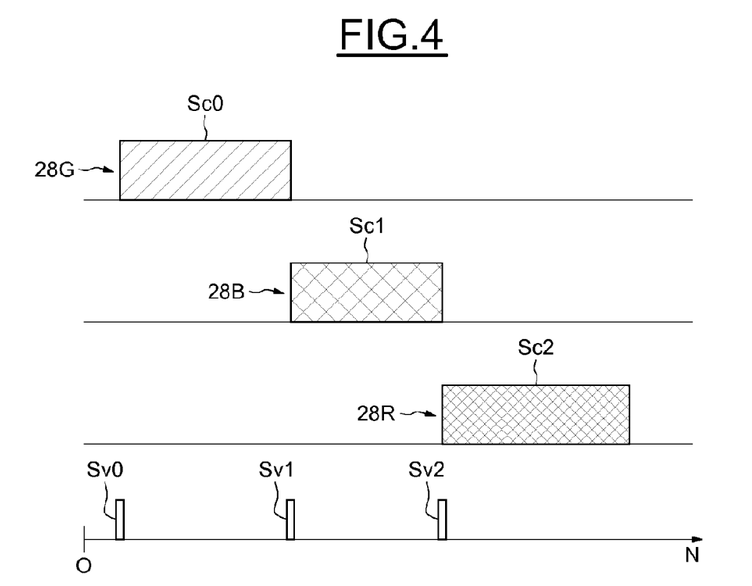
FIG. 4 shows a diagram of the operation of light-emitting diodes of the electronic device in FIG. 3.

From the first pulse Ir or when the number of pulses exceeds a predetermined small number Svo, and on condition that the speed of rotation is sufficient for the current generator 22 to supply power to the electronic circuits as will be seen below, the comparator 34 sends a control signal Sco to the power supply selector 35 which closes the switch 35G so that the light-emitting diodes 28G are supplied with power from the line 37 and light up, as illustrated in FIG. 4.

Once the number N of pulses delivered by the pulse counter 32 has crossed the threshold Sv1, the comparator 34 sends a control signal Sc1 to the power supply selector 35 which then opens the switch 35G in order to switch off the light-emitting diodes 28G and closes the switch 35B so that the light-emitting diodes 28B are supplied with power from the line 37 and light up, as illustrated in FIG. 4.

Once the number N of pulses delivered by the pulse counter 32 has crossed the threshold Sv2, the comparator 34 sends a control signal Sc2 to the power supply selector 35 which then opens the switch 35B in order to switch off the light-emitting diodes 28B and closes the switch 35R so that the light-emitting diodes 28R are supplied with power from the line 37 and light up, as illustrated in FIG. 4.

If the stream of water is stopped by the user of the head 1 and then restarted, the counter resumes counting from the number N stored during the stop.

The result of the preceding is that the user of the head 1 is informed of his or her water consumption by the colors emitted by the lighting means 28.

If the green diodes 28G are on, this indicates that his or her consumption is lower than the volume V1. If the blue diodes 28B are on, this indicates that his or her consumption is between the volumes V1 and V2. If the red diodes 28G are on, this indicates that his or her consumption is higher than the volume V2.

For example, the threshold Sv1 may be programmed so that the value of the volume V1 is between nineteen and twenty-one liters of water and the threshold Sv2 may be programmed so that the value of the volume V2 is between thirty-nine and forty-one liters of water.

The electronic device 25 additionally comprises means for managing electrical power consumption and resetting that are described below.

Figure 5A:
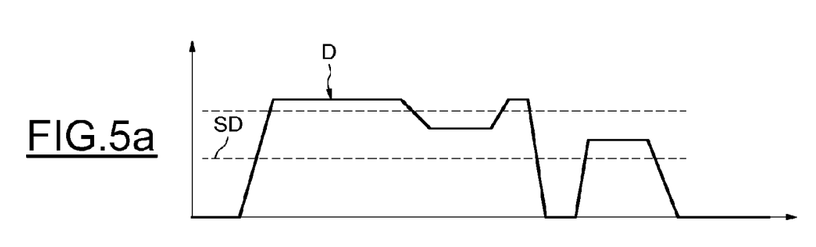
FIGS. 5a to 5d show diagrams of the operation of certain electronic components of the electronic device in FIG. 3.

As illustrated in FIG. 3, the electrical wires 27 coming from the stator 22 of the current generator are connected to the input of a rectifier 39 the output of which is connected to the input of a voltage regulator 40 having an output line 41. This output line 41 forms a main DC electrical power source, under a constant voltage. The value of the delivered direct current varies substantially in proportion to the speed of rotation of the stator 23 and hence to the speed of rotation of the turbine 17 under the effect of the stream of water flowing through the head 1. One variation according to the usage cycle of the head 1 is illustrated in FIG. 5a.

The electronic device 25 comprises a secondary source of electrical power formed by an electrical energy accumulator 42, such as a capacitor, connected to the output line 41 at a shared power supply point 43.

The electronic device 25 comprises a calculator 44 for calculating the speed of rotation of the turbine, one input of which receives the pulse signal Ir from the output of the comparator 29 via a line 45 and which is subject to a clock 46. The speed calculator 44 delivers, over a line 47 in real time, a speed signal D whose value is substantially proportional to the flow rate of the stream of water flowing through the head 1.

The electronic device 25 comprises a switch 48 and an adjustable-value current regulator 49 which are connected in series between the shared power supply point 43 and the power supply line 37, via a line 50 and a line 51.

The electronic device 25 comprises a comparator 52, one input of which is connected to the output line 47 of the speed calculator 44 and which is subject to a speed threshold SD and the output of which is connected to a control input of the switch 49 via a line 53. For example, the speed threshold SD may be programmed so as to correspond to a water flow rate value of between two and three liters per minute.

The output line 47 of the speed calculator 44 is connected to a control input of the current regulator 49.

The electronic device 25 operates in the following manner.

When the value of the speed signal D is lower than the speed threshold SD, the comparator 52 leaves the switch 48 in its open state O. The selector 35 is not supplied with electrical power and the lighting means 28 composed of the light-emitting diodes 28G, 28B and 28R are switched off.

When the value of the speed signal D is higher than the speed threshold SD, the comparator 52 delivers a signal for placing the switch 48 in its closed state. The lighting means 28 are supplied with power via the current regulator 49 and the power supply selector 35.

Figure 5B:
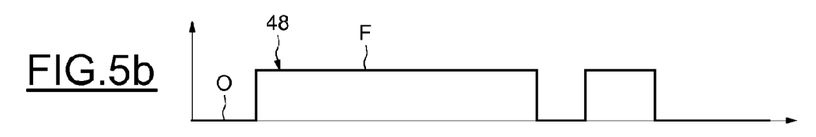

Open states O of the switch 48 and closed states F of the switch 48, depending on the flow rate signal of FIG. 5a, are illustrated in FIG. 5b.

When the switch 48 is in the closed state F, the current regulator 49 is controlled via the output line 47 of the comparator 52 such that the current delivered to the lighting means 28, from the shared power supply point 43 and via the power supply selector 35, varies substantially in proportion to the flow rate signal D, between a minimum value Cmin, for example equal to zero, and a maximum value Cmax.

Figure 5C:
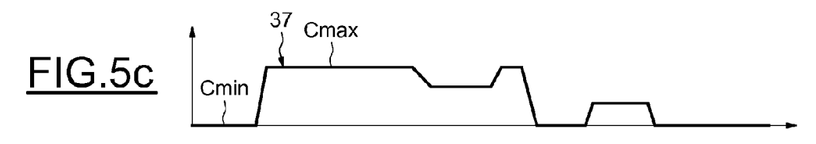
Figure 5D:
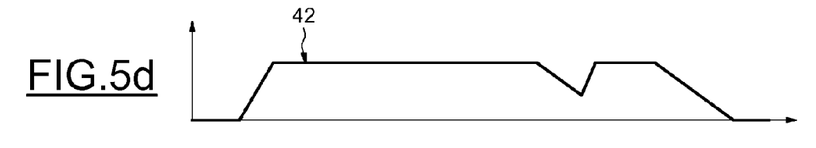

Variations in the current delivered to the lighting means 28 over the power supply line 37, depending on the variations in the flow rate signal D in FIG. 5a, are illustrated in FIG. 5c.

Thus the luminosity emitted by the lighting means 28 varies substantially in proportion to the flow rate of water through the head 1.

Furthermore, the various electronic components of the electronic device 25 may be supplied with electrical power in the following manner, so that the electric current delivered by the current generator 22 is capable of prioritizing the supply of power to the electronic circuits.

The shared power supply point 43 is capable of supplying a first group of circuits G1, which in particular comprises the comparator 29, the flow rate calculator 44, the clock 46, the comparator 52 and the switch 48, with electrical power via a line 54 so that they are able to operate.

The output line 51 of the switch 48 is capable of supplying a second group of circuits G2, which in particular comprises the pulse counter 32, the comparator 34, the power supply selector 35, the lighting means 28 and the regulator 49, with electrical power via a line 55 so that they are able to operate.

This results in the group of circuits G2 being supplied with power only if the switch 48 is in the closed state, as described above, i.e. only if the value of the speed signal D is above the speed threshold SD. The states for supplying the group of circuits G2 with power via the line 55 are identical to the open and closed states of the switch 48 as illustrated in FIG. 5b.

This also results in only the first group of circuits G1 being supplied with electrical power via the line 54, in the manner described below, when the speed signal D is below the speed threshold SD.

In the above case, as long as there is a stream of water flowing through the head 1, making the turbine 17 rotate, the shared power supply point 54 delivers the required current, which comes from the line 41 running from the current generator 22 and from the accumulator 42 that was previously charged by the current generator 22 during the first rotations of the turbine 17.

If the stream of water is stopped, the current generator 22 no longer delivers electric current to the shared point 43. Then, only the charge of the accumulator 42 is able to supply the first group of circuits G1, in particular the memory 32a, with power, so as to retain the number of pulses corresponding to the previously detected volume in the memory.

If the duration without the stream of water flowing through the head 1 exceeds a predetermined value Ta, fixed by a timer 56 of the first group of circuits G1, interposed between the clock 46 and the memory 32a, and on condition that the accumulator 42 retains sufficient charge, then the timer 56 orders a reset of the memory 52a. When the stream of water is restarted later on, for a new cycle, the counter 32 will count from zero as described above.

If the stream of water through the head 1 is re-established before said predetermined duration value Ta, the counter 32 counts from the number N stored in the memory 32a and the device operates as described above.

According to one variant embodiment, the predetermined value Ta may be determined by an estimated duration of discharge of the accumulator 42.

According to one variant embodiment, the luminous warning means could be supplemented with or replaced by a volume display.

The result of the preceding is that the device comprises means allowing the consumption of electrical power to be optimized so that the head is autonomous and, preferably, does not need an additional power source such as a battery.

According to one variant embodiment, the luminous warning means could be supplemented with or replaced by acoustic warning means.

According to one variant embodiment that is also illustrated in FIG. 3, the line 31 delivering the pulses Ir is connected to a circuit 57 for incrementing a permanent memory 58, of ROM type, for the purpose of tallying the number of successive pulses Ir and retaining this tally even in the absence of an electrical power supply.

The permanent memory 58 may be connected to a display circuit 59, whose display (not shown) may be borne by the body 2 of the shower head 1 and visible from the outside. Thus, the user may visually read off the water consumption.

The permanent memory 58 may be connected to a circuit 60 for transmitting/receiving radio signals, or to a modem including such a transmitting/receiving circuit, so as to allow water consumption to be remotely read.

According to one variant embodiment, the electrical energy accumulator 42 may be replaced by a battery that is not connected to the shared point 43, but arranged so as to supply the group G1 of electronic circuits with power when the turbine 17 is at a standstill.

Figure 6:
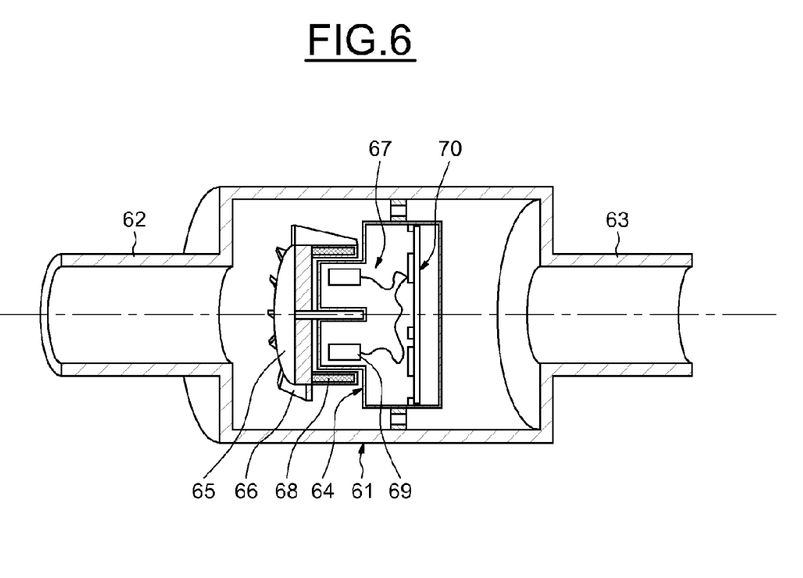
FIG. 6 shows a longitudinal cross section of another unit mounted in a pipe, along the axis of this pipe.

According to one variant embodiment illustrated in FIG. 6, a unit comprises a hollow tubular body 61 equipped with a connector 62 for the input of fluid and a connector 63 for the output of fluid, which are positioned, for example, so as to be opposite one another along the axis of the tubular body 61. For example, this unit may be installed on a water pipe or line, potentially on a pipe equipped with a faucet for delivering water.

In a manner equivalent to the example described with reference to FIGS. 1 and 2, a watertight hollow box 64 is installed inside the hollow body 61, which box bears, on the outside and on the water input connector 62 side, a turbine 65 equipped with fins 66, such that a stream of water incoming via the input connector 62 drives the turbine 65 to rotate, flows between the periphery of the box 64 and the peripheral wall of the hollow body 61, then exits via the output connector 63.

As above, the box 64 is equipped with a current generator 67 comprising a rotor 68 composed of magnets that are borne by the turbine 65 and a stator 69 positioned inside the box 64.

As above, an electronic device 70 is positioned inside the box 64.

According to one variant embodiment, an electronic device 70 may be equivalent to the electronic device 25 described above. In this case, either the luminous signaling device 28 is positioned outside the hollow body 61 or, if the signaling device 28 has been placed, as above, inside the hollow body 61, the wall of the hollow body 61 is at least partly made of a transparent or translucent material.

Figure 7:
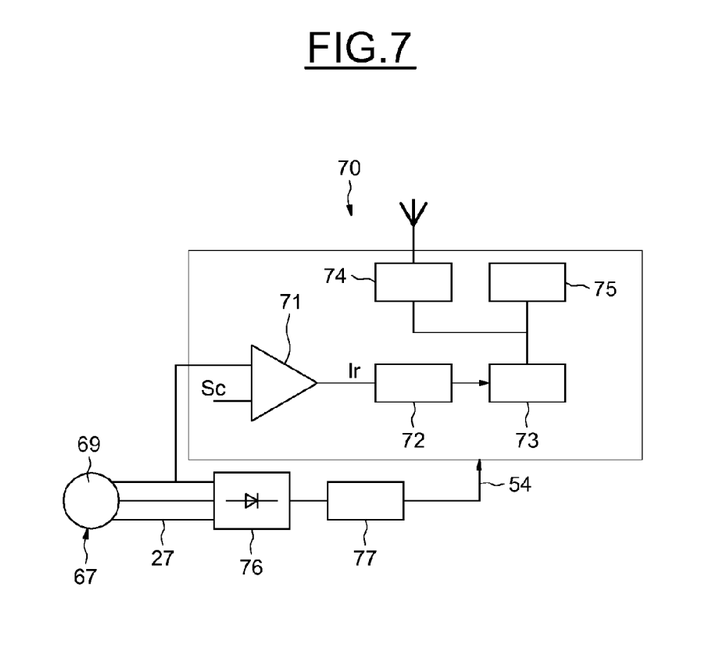
FIG. 7 shows an electronic diagram of an electronic device borne by the unit in FIG. 6.

According to one variant embodiment illustrated in FIG. 7, an electronic device 70 comprises a portion of the electronic device 25 described above.

For example, as illustrated in FIG. 7, the electronic device 70 may comprise a comparator 71, equivalent to the comparator 29, that delivers a pulse Ir each time the value of the substantially sinusoidal current output by the stator 69 passes above the threshold Sc, i.e. each time the turbine 65 passes through one determined angular position.

The pulses Ir output by the comparator 29 are delivered to a circuit 57 for incrementing a permanent memory 58, of ROM type.

The permanent memory 58 may be connected to a display circuit 59, the display (not shown) of which may be borne by the body 61 and visible from the outside. Thus, the user may visually read off the water consumption.

The permanent memory 58 may be connected to a circuit 60 for transmitting/receiving radio signals, or to a modem including such a transmitting/receiving circuit, so as to allow water consumption to be remotely read.

The electric current delivered by the electric current generator 67 supplies the electronic device 70 with power via a rectifier 76 and a voltage regulator 77.

Water consumption may be read off when the electronic device 70 is supplied with electrical power, i.e. when the turbine 65 is driven to rotate by the stream of water flowing through the hollow body 61. However, an electrical battery could be provided in order to supply the electronic device 70 with power when the turbine 65 is at a standstill.

The present invention is not limited to the examples described above. In particular, the watertight hollow box installed in the stream of fluid could have different forms and structures. The turbine could be installed in the stream of fluid in a different manner. Other variant embodiments are possible without departing from the scope of the invention.

The invention claimed is:

1. A method for monitoring the flow of a liquid and operation of an electronic device borne by a unit equipped with a turbine that is capable of being driven to rotate by a stream of a fluid and a means for detecting at least one determined angular position of said turbine and delivering an electric pulse each time the turbine passes through this angular position, comprising:
   incrementing an electric pulse counter each time the detection means delivers an electric pulse;
   setting, on the basis of an original value, value thresholds for the number of pulses;
   selectively activating a warning means for delivering various warning signals when the numbers of pulses delivered by the pulse counter are located within value ranges determined by said value thresholds; and
   resetting the pulse counter to said original value at the end of a predetermined period if the value of the number of pulses delivered by the pulse counter remained the same throughout this period.

2. The method as claimed in claim 1, comprising:
   calculating, in real time, the frequency of said pulses; and
   supplying the warning means with electrical power depending on this calculated frequency.

3. The method as claimed in claim 1, wherein said warning means is supplied with electrical power depending on the speed of rotation of said turbine.

4. The method as claimed in claim 1, wherein an electric current generator is connected to an electrical energy accumulator via a shared power supply point for the purpose of supplying electrical power, wherein the electronic device comprises at least a first group of circuits and a second group of circuits, the method comprising:
   detecting, in real time, the value of the speed of rotation of the turbine;
   supplying, via said shared point, the first group of circuits and the second group of circuits with electrical power if the value of the speed of rotation is higher than or equal to a speed threshold;
   supplying, via said shared point, only said first group of circuits with electrical power if the value of the speed of rotation is lower than said speed threshold.

5. A method for monitoring the flow of a liquid and operation of an electronic device borne by a unit equipped with a turbine that is capable of being driven to rotate by a stream of a fluid, with an electric current generator driven to rotate by said turbine and with an electrical energy accumulator connected to the current generator via a shared power supply point for the purpose of supplying the electronic device with electrical power and which comprises at least a first group of circuits and a second group of circuits, comprising:
   delivering electric pulses as the turbine rotates;
   detecting, in real time, the speed of rotation of the turbine depending on the delivered pulses;
   calculating the flow rate and/or the flowed volume of the fluid depending on the detected speed;
   activating a warning means depending on the calculated value of the flow rate and/or the flowed volume;
   supplying, via said shared point, the first group of circuits and the second group of circuits, which comprises the warning means, with electrical power if the value of the speed of rotation is higher than or equal to a rotational speed threshold;
   supplying, via said shared point, only said first group of circuits with electrical power if the value of the speed of rotation is lower than said rotational speed threshold.

6. The method as claimed in claim 5, wherein the current generator delivers an alternating current, said electric pulses being delivered each time the value of this current crosses a threshold.

7. A unit for monitoring the flow of a liquid, comprising a hollow body having an input and an output of the fluid, and equipped with:
   a turbine placed in said body and capable of being driven to rotate by the stream of the fluid;
   a current generator rotatably connected to said turbine; and
   an electronic device supplied with electrical power by said current generator and comprising:
      a means for detecting at least one determined angular position of said turbine, in order to deliver an electric pulse each time the turbine passes through this angular position;

a pulse counter for counting the successive pulses delivered by said detection means;

a means for fixing value thresholds for the number of pulses;

a comparison means for comparing the number of pulses delivered by the pulse counter to said thresholds and selectively delivering various control signals when the numbers of pulses delivered by the pulse counter are located within value ranges determined by said value thresholds; and a warning means selectively delivering various warning signals corresponding, respectively, to said various control signals;

wherein the electronic device comprises a means for resetting the pulse counter to an original value at the end of a predetermined period when the value of the number of pulses remains the same throughout this period.

8. The unit as claimed in claim 7, wherein the electronic device comprises a means for detecting the speed of rotation of the turbine and a means for supplying the warning means with electrical power depending on this speed of rotation.

9. The unit as claimed in claim 7, comprising an electrical energy accumulator connected to the current generator and capable of at least partially supplying the electronic device with power.

10. The unit as claimed in claim 7, wherein the current generator is connected to an electrical energy accumulator via a shared power supply point and wherein the electronic device comprises a first group of circuits and a second group of circuits; the first group of circuits being directly connected to said shared power supply point, the second group being connected to said shared power supply point via a switch that is controlled by a detector for detecting the speed of rotation of the turbine so as to supply the second group of circuits with power only if the speed of rotation of the turbine is higher than a rotational speed threshold.

11. The unit as claimed in claim 7, comprising a means for displaying values output by the pulse counter.

12. The unit as claimed in claim 7, comprising a watertight box that is installed inside said hollow body, which bears said turbine and in which the electronic device and the stator of the current generator are placed, the rotor of the current generator being borne by said turbine.

13. A unit for monitoring the flow of a liquid, comprising a hollow body having an input and an output of the fluid, and equipped with:

a turbine placed in said body and capable of being driven to rotate by the stream of the fluid;

a current generator rotatably connected to said turbine;

an electrical energy accumulator connected to the current generator via a shared power supply point; and an electronic device comprising a first group of circuits and a second group of circuits, the first group of circuits being directly connected to said shared power supply point, the second group being connected to said shared power supply point via a switch that is controlled by a detector for detecting the speed of rotation of said turbine so as to supply the second group of circuits with power only if the speed of rotation of said turbine is higher than a rotational speed threshold.

14. The unit as claimed in claim 13, wherein the electronic device comprises:

a means for detecting at least one determined angular position of said turbine, in order to deliver an electric pulse each time the turbine passes through this angular position;

a pulse counter for counting the successive pulses delivered by said detection means; and a calculation means connected to said detection means, for calculating, in real time, the frequency of said pulses, corresponding to the speed of rotation of the turbine.

15. The unit as claimed in claim 13, wherein the electronic device comprises:

a means for fixing value thresholds for the number of pulses;

a comparison means for comparing the number of pulses delivered by the pulse counter to said thresholds and selectively delivering various control signals when the numbers of pulses delivered by the pulse counter are located within value ranges determined by said value thresholds; and a warning means selectively delivering various warning signals corresponding, respectively, to said various control signals.

16. The unit as claimed in claim 13, wherein the electronic device comprises a means for displaying values output by the pulse counter.

17. The unit as claimed in claim 7, wherein the current generator delivers an alternating current, the unit comprising a means for delivering electric pulses each time the value of this current crosses a threshold.

18. The unit as claimed in claim 7, wherein said hollow body is a shower head.

19. The method as claimed in claim 4, wherein the electric current generator delivers an alternating current, said pulses being delivered each time the value of this current crosses a threshold.

* * * * *